UNITED STATES PATENT OFFICE.

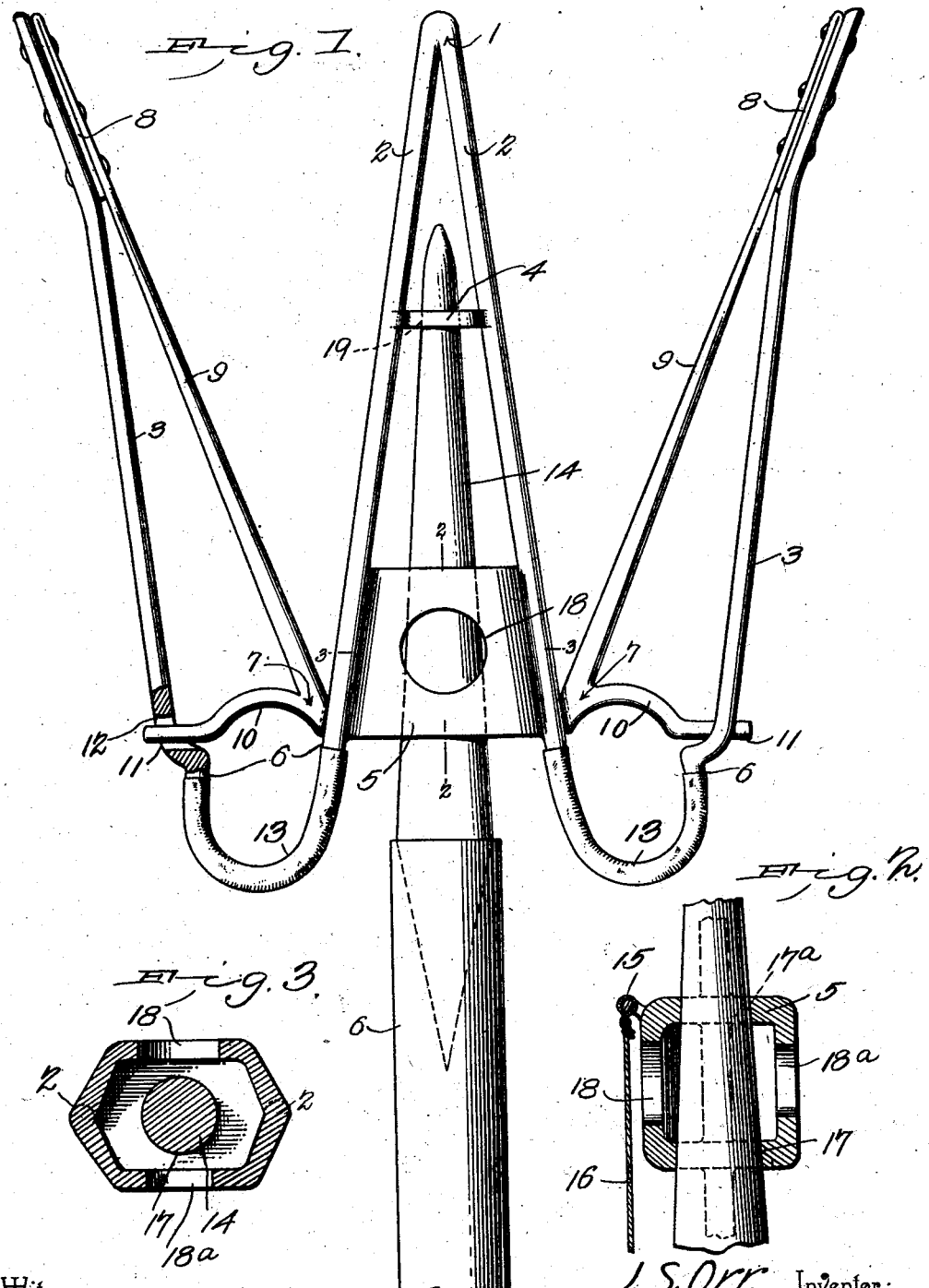

JOHN STEVENS ORR, OF AUGUSTA, KENTUCKY.

DEVICE FOR CATCHING AND HOLDING FOWLS.

SPECIFICATION forming part of Letters Patent No. 721,829, dated March 3, 1903.

Application filed October 23, 1902. Serial No. 128,492. (No model.)

*To all whom it may concern:*

Be it known that I, JOHN STEVENS ORR, a citizen of the United States, residing at Augusta, in the county of Bracken and State of Kentucky, have invented a new and useful Device for Catching and Holding Fowls, of which the following is a specification.

The invention relates to a device for catching and holding fowls.

The object of the present invention is to provide a simple, inexpensive, and efficient device designed for catching fowls and capable of enabling the same to be quickly captured without injury and adapted after a fowl has been caught to permit the same to stand naturally, whereby the fowl may be displayed to the greatest advantage.

A further object of the invention is to provide a device of this character adapted for catching fowls on the ground and capable also of being advantageously used for catching the same when the fowls are at roost on a perch or in a tree or in any other high or otherwise inaccessible place.

The invention consists in the construction and novel combination and arrangement of parts hereinafter fully described, illustrated in the accompanying drawings, and pointed out in the claims hereto appended.

In the drawings, Figure 1 is a side elevation of a device for catching and holding fowls constructed in accordance with this invention. Figs. 2 and 3 are detail sectional views on the lines 2 2 and 3 3 of Fig. 1.

Referring to the drawings, 1 designates a frame composed of a tapered central portion 2 and sides 3, diverging from the central tapered portion and forming inwardly-tapered spaces. The central portion 2 tapers outwardly and is preferably formed by two sides or bars arranged at an angle, as shown, and connected by cross-pieces 4 and 5, having openings for the reception of a pole or handle 6. These cross-pieces are preferably enlarged at the center, as shown, and they may be of any ornamental shape, and the frame may be otherwise ornamented, if desired. The sides 3 are connected with the central portion at the inner end of the frame by approximately semicircular portions or bends 6, and these curved portions or bends form recesses for the reception of the legs of a fowl, and they are of a size to comfortably receive the same without permitting the foot to pass through it. The frame forms a pair of flaring mouths or entrances to the recesses and is adapted to be readily pushed beneath the body of a fowl to bring the legs of the same into the recesses at the inner end of the frame.

The legs of a fowl are confined within the recesses at the inner end of the frame by movable jaws 7, provided with highly-resilient springs 8 and consisting of longitudinal portions 9 and transverse portions 10. The highly-resilient springs 8, which are suitably secured to the outer portions of the sides 3 at the inner faces thereof, connect the jaws with the same and permit the jaws to move transversely for admitting the legs of a fowl to the rear portion of the frame without bruising, scratching, or otherwise injuring the fowl. The longitudinal portion 9 of the jaw extends obliquely or diagonally of the frame from the outer portion of the outer side 3 to the inner end of the central portion at one side thereof, and it forms an inwardly-tapered space and is adapted to be readily moved laterally by the leg of a fowl.

The transverse portion 10 of the jaw is approximately semicircular, and it completes the circular engaging or confining portions of the device, and it fits against the adjacent side of the central portion of the frame. The transverse portion of the jaw is provided at its outer end with an arm 11, and it presents an inner concave face to the leg of a fowl, and any pressure on the jaw after the leg has entered the confining-space will operate to hold the jaw firmly closed and effectually prevent it from being accidentally opened. The transverse portion of the jaw is round to present a smooth surface to the leg of a fowl, and the arm 11, which is arranged in an approximately elliptical opening 12 of the side of the frame, guides the jaw thereon.

The resilient springs, which are very thin, are preferably formed integral with the jaws, and they may be secured to the outer portions of the sides 3 by rivets or any other suitable means.

The approximately semicircular connecting portions or bends 6, which coöperate with the curved portions of the jaws to form the circular confining-spaces for the legs of a fowl, is round or circular in cross-section and is designed to be provided with a suitable elastic covering 13, which may be constructed of any desired material and which is adapted to prevent the device from injuring the legs of a fowl; also, the curved transverse portions of the jaws may be similarly covered, if desired, and any other portion of the device may be provided with means for preventing the metal from coming in contact with a fowl.

The pole or handle, which may be of any desired length, may be constructed of any suitable material, and it is preferably provided at its outer end with an oppositely-tapered pin 14 to fit in the apertures of the cross-pieces 4 and 5, and it is removably connected with the frame to permit it to be detached after a fowl has been captured. The frame is provided with an eye 15, preferably mounted on the cross-piece 5 and adapted to receive a string or cord 16, so that after a fowl has been captured the handle or pole may be detached to permit the fowl to stand naturally. The fowl may be held by the string or cord when the handle is detached, and in this manner it will be permitted to flutter and otherwise display itself most advantageously.

The cross-piece 5 is in the form of a double socket and is composed of inner and outer end webs or flanges and longitudinal connecting webs or flanges. The inner and outer transverse webs or flanges are provided with openings 17 and 17$^a$, and the longitudinal connecting webs or flanges have similar openings 18 and 18$^a$. The openings 17 and 17$^a$ are arranged in alinement with the opening 19 of the cross-piece 4, and the openings 18 and 18$^a$ are transversely alined to receive the pin 14 to permit the devices to be arranged at right angles to the pole or handle for enabling the fowl-engaging mechanism to be set in proper position for operation overhead. This will permit the device to be advantageously employed for catching a fowl roosting in a high tree or in the upper portion of a barn or other high place. By this construction the wildest fowl of a barnyard may be quickly and easily captured at night.

The device is adapted to enable any one of a number of fowls to be quickly captured and will be found especially advantageous by fanciers and others, as any particular fowl may be readily obtained and the inconvenience resulting from a haphazard or chance capture will be obviated.

Although the device is particularly designed for capturing and holding fowls, yet it will be readily understood that the frame and the jaws may be varied in form to adapt them for catching and holding various other animals, and various other changes in the form, proportion, size, and the minor details of construction within the scope of the appended claims may be resorted to without departing from the spirit or sacrificing any of the advantages of this invention.

It will be seen that the device is exceedingly simple and inexpensive in construction, that it is easily operated, and that the jaws, which are normally closed, are adapted to open and close automatically to permit the legs of a fowl to enter the recesses at the back of the frame and to confine them therein.

What is claimed is—

1. A catching and holding device provided with a leg-receiving opening having a normally closed yieldable jaw arranged to be opened on coming in contact with an obstructing object and to close automatically on its release.

2. A catching and holding device comprising a frame having leg-receiving openings provided with flaring entrances, and normally closed yieldable jaws arranged to be opened on coming in contact with an obstructing object and to close automatically when released.

3. A catching and holding device comprising a frame having leg-receiving openings, and spring-actuated jaws normally closed and provided with obliquely-disposed portions arranged to be operated by the legs of an animal, substantially as described.

4. A catching and holding device comprising a frame having leg-receiving openings, and spring-actuated jaws having transverse portions for confining the legs of an animal in the openings and provided with obliquely-arranged outer portions to be operated by the legs of an animal, substantially as described.

5. A catching and holding device comprising a frame having a central portion and provided with side portions spaced from the central portion, and spring-actuated jaws mounted in the spaces between the side and central portions of the frame, and normally arranged in a closed position and having obliquely-disposed portions arranged to be engaged by the legs of an animal to open the jaws, substantially as described.

6. A catching and holding device comprising a frame composed of a tapered central portion and diverging side portions, and normally closed spring-actuated jaws mounted in the spaces between the central and side portions of the frame, substantially as described.

7. A catching and holding device comprising a frame having central and side portions, the latter being provided with guide-openings, and normally closed spring-actuated jaws arranged in the spaces between the central and side portions of the frame and provided with transverse portions guided in the said openings, substantially as described.

8. A catching and holding tool comprising a frame having an outwardly-tapered central portion provided with sides spaced apart and the outwardly-diverging side portions connected with the sides of the central portion, means located between the sides of the central portion for the reception of a handle or pole, and normally closed spring-actuated jaws mounted on the frame, substantially as described.

9. A catching and holding tool comprising a frame provided with yielding catching and holding means and having a double socket provided with openings arranged longitudinally and transversely of the device, whereby the same may be arranged longitudinally and transversely of a pole, substantially as described.

In testimony that I claim the foregoing as my own I have hereto affixed my signature in the presence of two witnesses.

JOHN STEVENS ORR.

Witnesses:
BEN HARBISON,
W. C. SADLER.